(12) United States Patent
Mueller

(10) Patent No.: US 9,283,479 B2
(45) Date of Patent: Mar. 15, 2016

(54) SYSTEM AND METHODS FOR PRIZE-BASED MARKETING

(71) Applicant: James Gregory Mueller, Austin, TX (US)

(72) Inventor: James Gregory Mueller, Austin, TX (US)

(*) Notice: Subject to any disclaimer, the term of this patent is extended or adjusted under 35 U.S.C. 154(b) by 0 days.

(21) Appl. No.: 14/114,556

(22) PCT Filed: Jul. 14, 2013

(86) PCT No.: PCT/US2013/050422
§ 371 (c)(1),
(2) Date: Oct. 29, 2013

(87) PCT Pub. No.: WO2014/065909
PCT Pub. Date: May 1, 2014

(65) Prior Publication Data
US 2014/0121003 A1    May 1, 2014

Related U.S. Application Data

(60) Provisional application No. 61/718,257, filed on Oct. 25, 2012.

(51) Int. Cl.
| | | |
|---|---|---|
| G06F 17/00 | (2006.01) | |
| A63F 13/30 | (2014.01) | |
| A63F 13/211 | (2014.01) | |
| A63F 13/63 | (2014.01) | |
| A63F 13/92 | (2014.01) | |
| A63F 13/61 | (2014.01) | |

(52) U.S. Cl.
CPC .............. *A63F 13/12* (2013.01); *A63F 13/211* (2014.09); *A63F 13/61* (2014.09); *A63F 13/63* (2014.09); *A63F 13/92* (2014.09)

(58) Field of Classification Search
USPC ...................... 463/16–25; 705/14.4
See application file for complete search history.

(56) References Cited

U.S. PATENT DOCUMENTS

| | | | |
|---|---|---|---|
| 8,407,086 B2* | 3/2013 | Kusumoto et al. ......... 705/14.16 |
| 2002/0065746 A1 | 5/2002 | Lewis | |
| 2007/0244585 A1 | 10/2007 | Speiser | |
| 2008/0300055 A1 | 12/2008 | Lutnick | |
| 2012/0122529 A1 | 5/2012 | Lyons | |
| 2013/0166364 A1* | 6/2013 | Kusumoto et al. ......... 705/14.16 |
| 2014/0094256 A1* | 4/2014 | Hilbert et al. ................. 463/20 |
| 2014/0294344 A1* | 10/2014 | Fondeur ......................... 385/17 |

FOREIGN PATENT DOCUMENTS

WO    WO-2012135048 A2    10/2012

* cited by examiner

*Primary Examiner* — Ronald Laneau
(74) *Attorney, Agent, or Firm* — Mitchell Law PLLC; Matthew W. Mitchell

(57) ABSTRACT

A method is described for providing advertisements on a mobile device. The method includes monitoring tactile input from a user, providing a game comprising identifiable game pieces on a playing surface, and displaying an advertisement adjacent to the playing surface. Play of the game is initiated based upon the monitored tactile input from the user. One or more of the plurality of identifiable game pieces is associated to a prize based upon input from a random number generator. A user is able to select a game piece from the plurality of game pieces in an attempt to select the game piece associated with the prize. Upon selection of the associated game piece, the user is awarded the prize. By requiring shaking of the mobile device to initiate a game the user is more engaged in game play, better retaining focus to the game and advertisement.

20 Claims, 11 Drawing Sheets

FIG. 8

| | Title | Ball Image | Selected Ball Image | Winning Ball Image | Winning Ball On Select Image | Game BG Color | Rules BG Color | Rules Text Color | Prize BG Color | Prize Text Color | Is Default | Preview | Edit |
|---|---|---|---|---|---|---|---|---|---|---|---|---|---|
| ☐ | Default Ball | ○ | ○ | ○ | ○ | CCCCCC | 99CC66 | 0000FF | 66FFCC | 6600FF | True | Preview | ✎ |
| ☐ | Phillips 66 | ○ | 66 | ○ | ○ | | | | | | False | Preview | ✎ |
| ☐ | Soccer | ⚽ | ⚽ | ○ | ⚽ | FF0000 | FFFF00 | | | | False | Preview | ✎ |

Manage Game Themes — Delete | Add New

Menu: Welcome: Gaurav Saran | My Profile | Manage Members | Create Mobile Game | Create Web Game | Manage Games | Manage Sponsors | Monitor Registrations | Game Messeges | Game Shapes | Game Themes | Game ADs | Help | Logout 250, 252

FIG. 9

SYSTEM AND METHODS FOR PRIZE-BASED MARKETING

CROSS REFERENCE TO RELATED APPLICATIONS

This application claims the benefit of PCT Application No. PCT/US13/50422 filed on Jul. 14, 2013 which claims the benefit of U.S. Provisional Application No. 61/718,257 filed on Oct. 25, 2012 which are both hereby incorporated herein by reference.

TECHNICAL FIELD

The present invention relates generally to mobile computing devices. In particular, the present invention relates to a method for marketing and promoting using an electronic game application.

BACKGROUND

The statements in this section merely provide background information related to the present disclosure and may not constitute prior art.

The Internet has transformed both consumer sales and advertising. Where once a person had to physically visit a store to review the available merchandise and make a selection, now people can sit in front of a computer in their home and review a vast array of selections and offerings. Once a consumer has decided to purchase an item, they can initiate an online purchase and have the item shipped directly to their home. Before online sales and product promotion, companies had to strategically market and promote their offerings to consumers, through traditional media such as television, newspapers or billboards and hope that the consumers were paying attention as they drove by the billboard or read the article on that page of the newspaper.

With the Internet, numerous, dynamic advertisements can be marketed to consumers on a website-to-website basis, via mobile software application, or based upon selected downloaded content. Further, the ability to gather information on users and the flexibility of digital media allow advertisers to be precise in targeting their ads, has generated complex marketing and promotional strategies.

Mobile communications devices such as smart phones and tablets devices are further transforming consumer sales and advertising. Instead of having to be in front of a desktop computer, consumers can shop and purchase from almost anywhere they have cell phone coverage. An advertisement can be delivered to an individual's smart phone or tablet, with the device notifying the individual of the availability of the ad. Further, the global positioning systems (GPS) and cameras built into mobile devices provide new ways to target ads to consumers and to provide inducements or rewards. Using GPS, a person can be presented with ads based upon their current location and proximity to offered products and services. Further, a scannable barcode printed on a poster can allow a consumer in a sporting event to use their mobile phone camera to scan the code and instantly receive, on their phone, an ad or special offer, or even a reward such as a free beverage from the concession stand.

The ubiquity and intrusiveness of mobile devices also pose challenges for consumer sales and advertising. People are increasingly inundated with information and advertising, making it more difficult for a company or advertiser to engage an attentive consumer. Games have historically captured people's attention. The opportunity to win something based on luck, not skill or mental exertion, can give people a sense of anticipation, increasing attentiveness and engagement with potential advertisement messages.

Mobile devices allow games to be delivered directly to a consumer, providing a quick and easy respite from the real world. Further, mobile devices can be used to instantly deliver the prize or award, continuing the consumer's engagement. For companies selling to and advertising to consumers, games offer a unique engagement tool, something that can be used to capture and keep a consumer's attention and allow the presentation of a special offer or advertisement.

Therefore, companies that sell and advertise to consumers would benefit from a game that can be used to engage consumers and present advertising, and further a platform that allows the creation of custom smart phone or tablet games that also presents advertising and instant prizes or rewards.

SUMMARY

A method is described for providing advertisements on a mobile device. The method includes monitoring tactile input from a user, providing a game comprising identifiable game pieces on a playing surface, and displaying an advertisement adjacent to the playing surface. Play of the game is initiated based upon the monitored tactile input from the user. One or more of the plurality of identifiable game pieces is associated to a prize based upon input from a random number generator. A user is able to select a game piece from the plurality of game pieces in an attempt to select the game piece associated with the prize. Upon selection of the associated game piece, the user is awarded the prize. By requiring shaking of the mobile device to initiate a game the user is more engaged in game play, better retaining focus to the game and advertisement.

An additional embodiment allows player-users to be offered an instant prize at a venue or sporting event. In response to a prompting on a video screen, announcement or posters, attendees can use their mobile devices to send their picture to the game operation module. The pictures are displayed as a group on the video monitor at the venue or sporting event. The game operation module then randomly chooses one of the participants as the winner.

Additional embodiments provide a platform for creating and distributing gaming application with advertisements and prizes to mobile devices. Game designers are able to create, save and distribute the games to mobile device users through the administrative platform. In one embodiment, game designers are able to select the image and number of game pieces, as well as how those pieces change during different parts of the game. The game designer is also able to dedicate part of the game screen to advertisements as well as decide the odds of winning. Gameplay parameters, game settings, and distribution to the mobile users may be managed and monitored through the administrative platform.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which:

FIGS. 7-11 show various administrative interfaces for managing and customizing games and game features, in accordance with the present disclosure.

DETAILED DESCRIPTION

Figure 1:
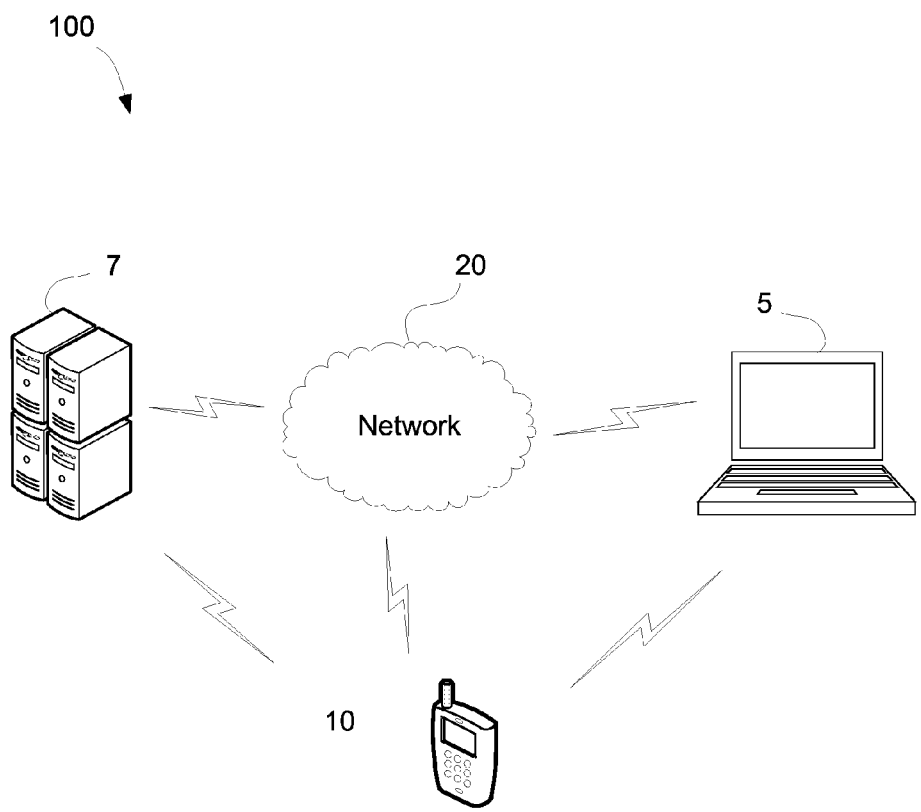
FIG. 1 schematically shows an exemplary marketing system, in accordance with the present disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring now to the drawings, wherein the depictions are for the purpose of illustrating certain exemplary embodiments only and not for the purpose of limiting the same, FIG. 1 schematically shows an exemplary marketing system 100 that may help implement the methodologies of the present disclosure. The system 100 includes a computing device 5, a server system 7, a network 20, and a mobile device 10. As shown in FIG. 1, the computing device 5 may be directly communicatively connected to the mobile device 10 via the network 20 and/or directly communicatively connected to the mobile device 10. The server system 7 may be directly communicatively connected to the computing device 5 and the mobile device 10 via the network 20. The mobile device 10 may be physically connected to the network 20 or the computing device 5 during selected periods of operation without departing from the teachings herein. Components of the system 100 are shown in FIG. 1 as single elements. Such illustration is for ease of description and it should be recognized that the system 100 may include multiple additional mobile and computing devices.

The network 20 may be any suitable series of points or nodes interconnected by communication paths. The network 20 may be interconnected with other networks and contain sub networks network such as, for example, a publicly accessible distributed network like the Internet or other telecommunications networks (e.g., intranets, virtual nets, overlay networks and the like). The network 20 may facilitates the exchange of data between and among the mobile device 10, the computing device 5, and the server system 7 although in various embodiments the mobile device 10 may be directly connected to the computing device 5.

The computing device 5 and the server system 7 may each be: various embodiments of a computer including high-speed microcomputers, minicomputers, mainframes, and/or data storage devices. The server system 7 preferably executes database functions including storing and maintaining a database and processes requests from the mobile device 10 and the computing device 5 to extract data from, or update, a database as described herein below. The server 7 may additionally provide processing functions for the mobile device 10 and the computing device 5 as will become apparent to those skilled in the art upon a careful reading of the teachings herein.

In addition, the mobile device 10 may include one or more applications that the user may operate. Operation may include downloading, installing, turning on, unlocking, activating, or otherwise using the application. The application may comprise at least one of an algorithm, software, computer code, and/or the like, for example, mobile application software. In the alternative, the application may be a website accessible through the world wide web.

Figure 2:
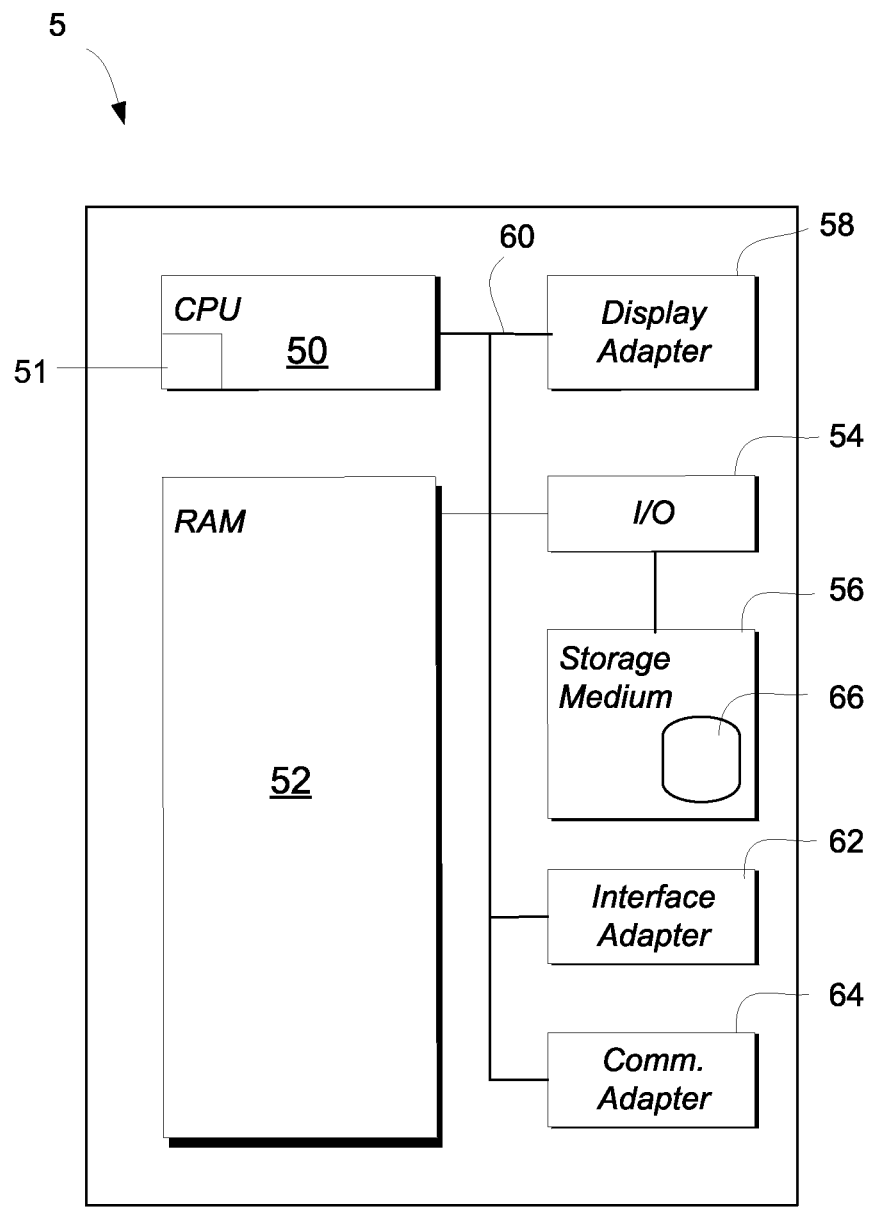
FIG. 2 schematically shows an exemplary computing device, in accordance with the present disclosure.

FIG. 2 shows the exemplary computing device 5, although equivalent components may be similarly configured in the server system 7. The computing device 5 includes a central processing unit (CPU) 50, random access memory (RAM) 52, input/output circuitry 54 for connecting peripheral devices such as a storage medium 56 to a system bus 60, a display adapter 58 for connecting the system bus 60 to a display device, a user interface adapter 62 for connecting user input devices such as a keyboard, a mouse, and/or a microphone, to the system bus 60, and a communication adapter 64 for connecting the computing device 5 to the network 20. In one embodiment, the communication adapter 64 is a wireless adapter configured for extraterrestrial communication such as in a communications satellite. The storage medium 56 is configured to store, access, and modify a database 66, and is preferably configured to store, access, and modify structured or unstructured databases for data including, for example, relational data, tabular data, audio/video data, and graphical data.

The central processing unit 50 is preferably one or more general-purpose microprocessor or central processing unit(s) and has a set of control algorithms, comprising resident program instructions and calibrations stored in the memory 52 and executed to provide the desired functions. In one embodiment, an application program interface (API) is preferably executed by the operating system for computer applications to make requests of the operating system or other computer applications. In one embodiment, the CPU 50 includes a random number generator 51 configured to selectively generate a random number. One skilled in the art will recognize that the functions of the random number generator 51 may be implemented as a executable program instructions. The description of the central processing unit 50 is meant to be illustrative, and not restrictive to the disclosure, and those skilled in the art will appreciate that the disclosure may also be implemented on platforms and operating systems other than those mentioned.

Figure 3:
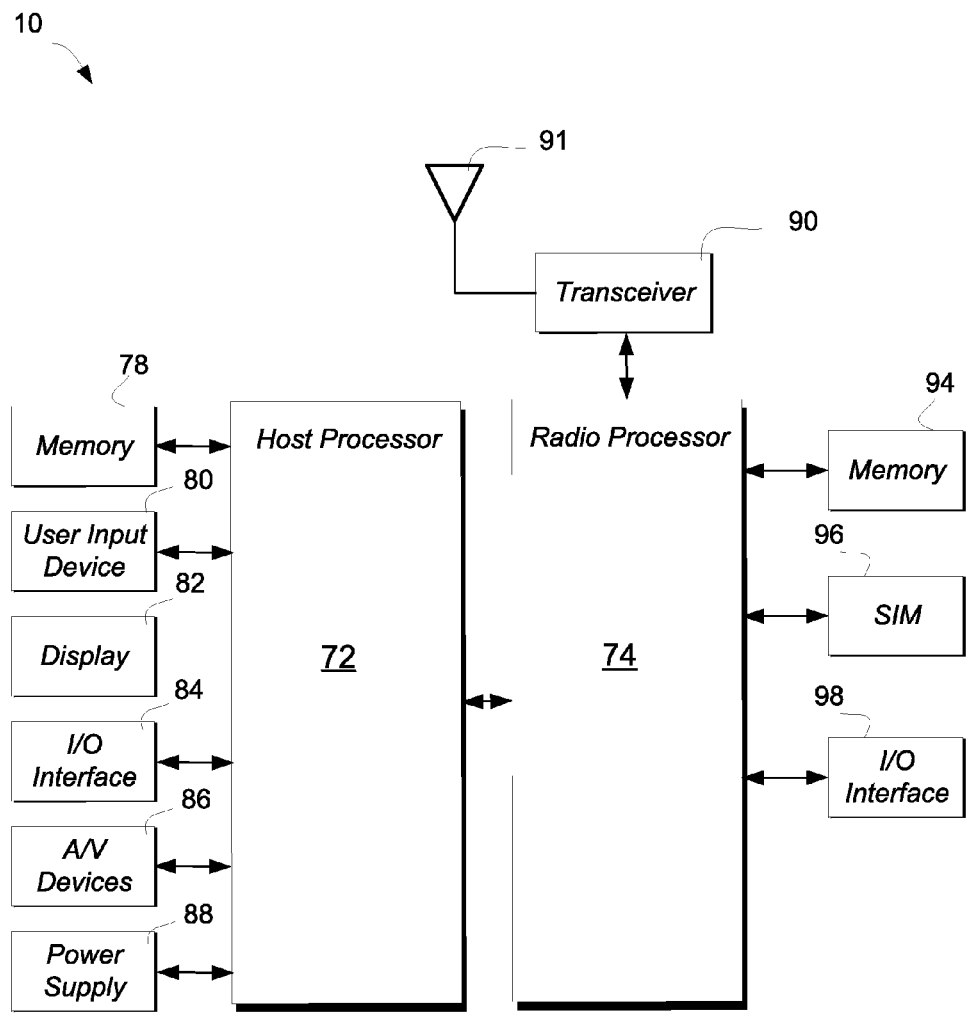
FIG. 3 schematically shows an exemplary mobile device, in accordance with the present disclosure.

FIG. 3 schematically shows an exemplary embodiment of the device 10 configured to operate in a mobile environment. As shown in FIG. 3, the device 10 may include a dual processor architecture, including a host processor module 72 and a radio processor 74 (e.g., a base band processor or modem). The host processor module 72 and the radio processor 74 may be configured to communicate with each other using an interface. The device 10 may additionally include any digital and/or analog circuit elements, comprising discrete and/or solid state components, suitable for use with the embodiments disclosed herein. One skilled in the art will recognize upon a careful reading of the teachings herein that the radio processor may be omitted in a wired embodiment of the device 10.

The host processor module 72 may be configured to execute various computer programs (e.g., software, firmware, or other code) such as application programs and system programs to provide computing and processing operations for the device 10. The radio processor 74 may be responsible for performing data communications operations for device 10 such as transmitting and receiving data information over one or more wireless communications channels. Although the host processor module 72 and the radio processor 74 are shown and described as separate processors, such an illustration is for ease of description and it should be recognized that the functions performed by the host processor module 72 and the radio processor 74 may be combined on a single chip.

In various embodiments, host processor module 72 may be implemented as a host central processing unit ("CPU") using any suitable processor or logic device, such as a general purpose processor, or other processing device in alternative embodiments configured to provide processing or computing resources to device 10. For example, host processor module 72 may be responsible for executing various computer programs such as application programs and system programs to provide computing and processing operations for device 10. The application software may provide a graphical user interface ("GUI") to communicate information between device 10 and a user. The computer programs may be stored as firmware on a memory associated with processor 72, may be loaded by a manufacturer during a process of manufacturing device 10, and may be updated from time to time with new versions or software updates via wired or wireless communication.

System programs assist in the running of a computer system. System programs may be directly responsible for controlling, integrating, and managing the individual hardware components of the computer system. Examples of system programs may include, for example, an operating system, a kernel, device drivers, programming tools, utility programs, software libraries, an application programming interface ("API"), a GUI, and so forth.

The memory module 78 is preferably coupled to the host processor module 72. In various embodiments, the memory module 78 may be configured to store one or more computer programs to be executed by the host processor module 72. Although the memory module 78 is shown as being separate from the host processor module 72 for purposes of illustration, in various embodiments some portion or the entire memory module 78 may be included on the same integrated circuit as the host processor module 72.

A user input device 80 may be coupled to the host processor module 72. The user input device 80 may include, for example, an alphanumeric, numeric key layout and an integrated number dial pad. The device 10 also may include various keys, buttons, and switches such as, for example, input keys, preset and programmable hot keys, left and right action buttons, a navigation button such as a multidirectional navigation button, power/end buttons, preset and programmable shortcut buttons, a volume rocker switch, a ringer on/off switch having a vibrate mode, a keypad and so forth.

The host processor module 72 may be coupled to a display device 82. The display device 82 may include any suitable visual interface for displaying content to a user of the device 10, such as a liquid crystal display ("LCD") such as a touch-sensitive color (e.g., 16-bit color) thin-film transistor ("TFT") LCD screen. In some embodiments, the touch-sensitive LCD may be used with a stylus and/or a handwriting recognizer program.

An I/O interface 84 is preferably coupled to the host processor module 72. The I/O interface 84 may include one or more I/O devices such as a serial connection port, an infrared port, wireless capability, and/or integrated 802.11x (WiFi) wireless capability, to enable wired (e.g., USB cable) and/or wireless connection to a local or networked computer system, such as a workstation client, and/or the server 5.

In one embodiment, the device 10 includes an audio/video ("A/V") module 86 coupled to the host processor module 72 for communicatively connecting and communicating therebetween to various audio/video devices. The A/V module 86 may be configured to support A/V capability of the device 10 including components such as, a microphone, one or more speakers, an audio port to connect an audio headset, an audio coder/decoder (codec), an audio player, a video codec, a video player, and so forth. The A/V input module 86 may include an imaging module configured to capture digital images. The imagining module may include an optical sensor, e.g., a charged coupled device (CCD) or a complementary metal-oxide semiconductor (CMOS) optical sensor to facilitate camera functions, such as recording photographs and video clips. The image frames may be processed by the memory 78 or displayed on the display 82.

A power supply 88 configured to supply and manage power to components of device 10 is preferably coupled to the host processor module 72.

As described herein above, the radio processor 74 may perform voice and/or data communication operations for the device 10. For example, the radio processor 74 may be configured to communicate voice information and/or data information over one or more assigned frequency bands of a wireless communication channel. The radio processor 74 may be implemented as a communications processor using any suitable processor or logic device, such as a modem processor or baseband processor. The radio processor 74 may include, or be implemented as, a digital signal processor ("DSP"), a media access control ("MAC") processor, or any other type of communications processor in accordance with the described embodiments. Memory 94 may be coupled to the radio processor 74. Although memory 94 is shown as being separate from and external to the radio processor 74 for purposes of illustration, in various embodiments some portion may be included on the same integrated circuit as the radio processor 74. Further, the host processor module 72 and the radio processor 74 may share a single memory.

The device 10 may include one or more transceivers 90 coupled to the radio processor 74, each transceiver 90 may be configured to communicate using a different types of protocol, communication ranges, operating power requirements, RF sub-bands, information types (e.g., voice or data), use scenarios, applications, and so forth. For example, the transceiver 90 may include a Wi-Fi transceiver and a cellular or WAN transceiver configured to operate simultaneously. The transceiver 90 may be implemented using one or more chips as desired for a given implementation. Although transceiver 90 is shown as being separate from and external to the radio processor 74 for purposes of illustration, in various embodiments some portion may be included on the same integrated circuit as the radio processor 74. The transceiver is preferably connected to an antenna 91 for transmitting and/or receiving electrical signals. As shown in FIG. 3, the antenna 91 may be coupled to the radio processor 74 through transceiver 90.

A SIM device 96 may be coupled to radio processor 74. The SIM device 96 may be implemented as a removable or non-removable smart card configured to encrypt voice and data transmissions and to store user-specific data for allowing a voice or data communications network to identify and authenticate the user. The SIM device 96 also may store data such as personal settings specific to the user.

An I/O interface 98 may be coupled to the radio processor 74. The I/O interface 98 may include one or more I/O devices to enable wired (e.g., serial, cable, etc.) and/or wireless (e.g., WiFi, short range, etc.) communication between the device 10 and one or more external computer systems.

Figure 4:
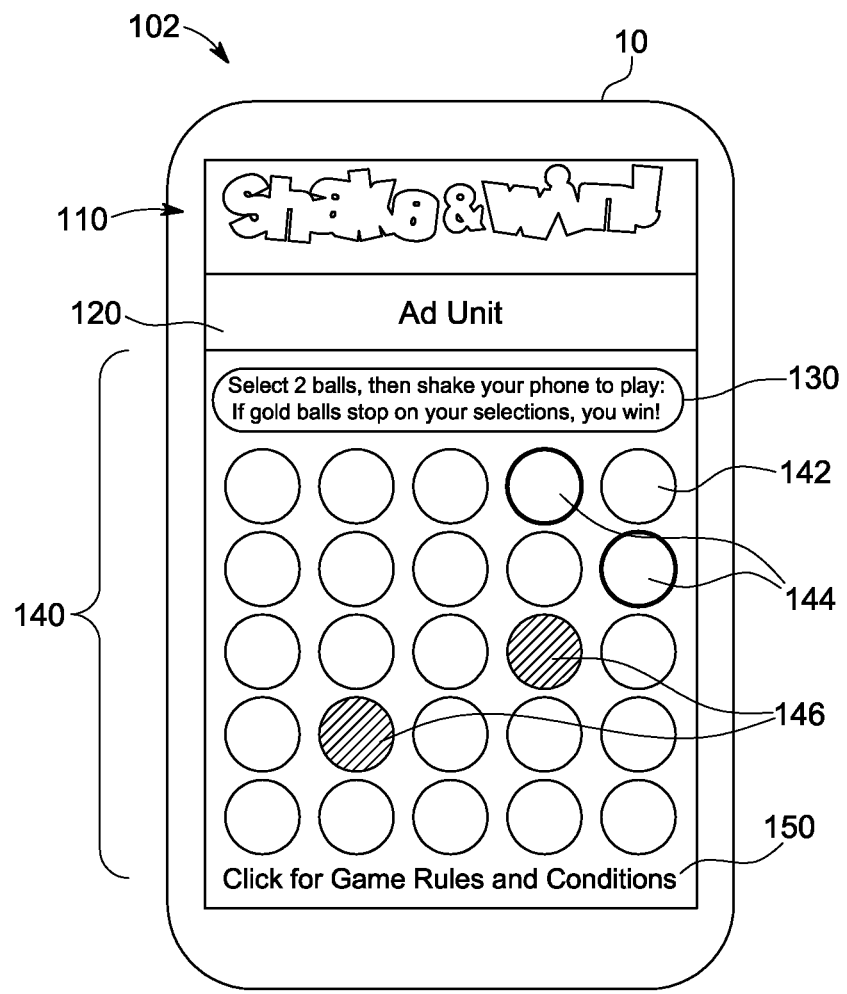
FIG. 4 shows an exemplary user interface for the mobile device, in accordance with the present disclosure.

FIG. 4 shows an exemplary user interface 102 for the mobile device 10. The exemplary user interface 102 is configured to enable a user to interface with a gaming application. The gaming application may include a mobile module and a game operation module. The game operation module may be hosted on the server system 7 and communicatively accessible via the network 20, on a private network, or may reside on the mobile device 10. The mobile module may be an application that is downloaded to and resides on the mobile device or can be a located at an Internet address and accessed by the mobile device 10 via the network 20, i.e., the Internet.

As FIG. 4 shows, the user interface 102 preferably includes a menu or title module 110, an advertisement module 120, a navigational module or button 130, an interactive playing module 140, and a navigational link 150. The title module 110 may include a game logo. The title module may include one or more navigational links such as a hyperlink. In one embodiment, the title module 110 may be configured to display gaming application information such as update notifications. The advertisement module 120 may include a banner advertisement and/or a video advertisement. The navigational module 130 may include an informational display component. The information communicated to the user may include game rules or instructions. The interactive playing module 140 is configured to display gameplay and accept user input. Functions of the device may display as hyperlinks to pages and/or informational modules e.g., the navigational link 150 may be hyperlinked to a webpage having a terms and conditions license.

Initially a mobile device user, i.e., user-player, is presented with an opportunity to play the game. This opportunity can be delivered in accordance of a previously expressed desire to receive games and so pushed to the mobile device 10. The game opportunity could also be an outcome of a previous interaction, for example a person that has played and lost the lottery can be automatically presented with a second game. Further, the game opportunity could be automatically presented to the user based on their physical location as derived from the phone's GPS or in response to the mobile device user scanning a QR code on a poster.

Gameplay of the gaming application includes providing, in response to a request from a user, a game comprising a plurality of identifiable game pieces 142, the game pieces displayed on the interactive playing module 140, i.e., a playing surface. The mobile device receives, from the server, an advertisement for display adjacent to the playing surface. The game is initiated upon player request, the request may be indicated by player supplied tactile input such as shaking of the mobile device, the shaking determined by monitoring a gyroscope or accelerometer within the mobile device. Game rules are predetermined by a merchant-user or administrator of the game. For example, the game rules may indicate a number of matches of user-selected game pieces 144 to game pieces selected by the gaming application and instruct the game play to select the number of game pieces.

After initiation of a game, a player selects the predetermined number of game pieces. After selection of the game pieces 144, the user is then instructed to shake the mobile device 10. Upon shaking, or a predetermined time period thereafter, the gaming application initiates selection of the game pieces at random. Selection of the game pieces includes a show display to the user. The show display indicates to the user that the gaming application is sorting through the game pieces on the screen in a random process, instead of the nearly instantaneous selection enabled by computing processors available on the mobile device. In one embodiment, the show display includes changing images of the game pieces randomly or sequentially with one or more random stops. Changing images can include a visual highlight or temporary transparent visual modulation. When the random number generator completes its process the randomly selected game pieces are highlighted, along with the corresponding winning game pieces 146 as visual indicia, for example.

FIG. 4 shows the user-selected game pieces 144 and the game pieces selected by the gaming application 146. Insofar as the selection is not congruent, the user-player is considered by the gaming application to have lost the game. When the user-selected game pieces 144 match the game pieces selected by the gaming application, the user-player is considered to have won the game. The game operation module then communicates to the user-player an informational display showing the awarded prize or describing the awarded prize therein. In one embodiment, the game operation module may send notification and the prize via a text message or email to the mobile device of the user-player.

An additional embodiment of the invention allows people in a particular location, for example a venue or sporting event, to be offered an opportunity to participate in a group contest to win an instant prize. In operation, an invitation to participate in the contest is presented to the people in the location. This invitation can be presented by a range of media, for example as an announcement over the public address system, on the scoreboard or video monitor, on posters positioned around the arena or on other printed material, for example the event tickets. In one embodiment, user-players participate in the game by taking a picture of themself using their mobile device and sending that picture to the game control module of the server. The picture can be sent via a text message, email or uploaded to a web page that can be accessed with a mobile device. In one embodiment, participants can also use a previously taken picture. The submitted pictures are stored in a database of the server.

The possible number of participants is determined by the game control module. The number of participants can be fixed, e.g., a first 300 to submit their pictures, or variable, for example every submission received within ten minutes of the game invitation being presented. When the submission acceptance period is closed, the game may be initiated.

In one embodiment, the game control module displays pictures of the participants on a display device, for example the video monitor in the area. When the game begins the pictures displayed on the video monitor are randomly highlighted, suggesting the random number generator is sorting through the different pictures. The random number generator then selects the winner or winners and highlights the winner's pictures on the video monitor. Further, the game control module can send a text or email message to the winner or winners on their mobile devices which can include the prize. The prize can be something accessed at that event, for example, access to the sideline of the event, or a free drink, participation in a subsequent event, or a different kind of prize.

In one embodiment, submitted pictures are analyzed to filter non-responsive and undesirable pictures, for example, non-facial pictures. Filtering may include checking a timestamp or performing facial recognition algorithms to determine that a face is indeed present on the submitted photograph. Pictures non in compliance with the predetermined criteria may be excluded from public presentation and prize award. For example, in one embodiment pictures may be excluded from the displaying and the awarding when user's pictures have a timestamp greater than a predetermined time period in the past or failing to confirm that a face is included in the received user's picture.

Figure 5:
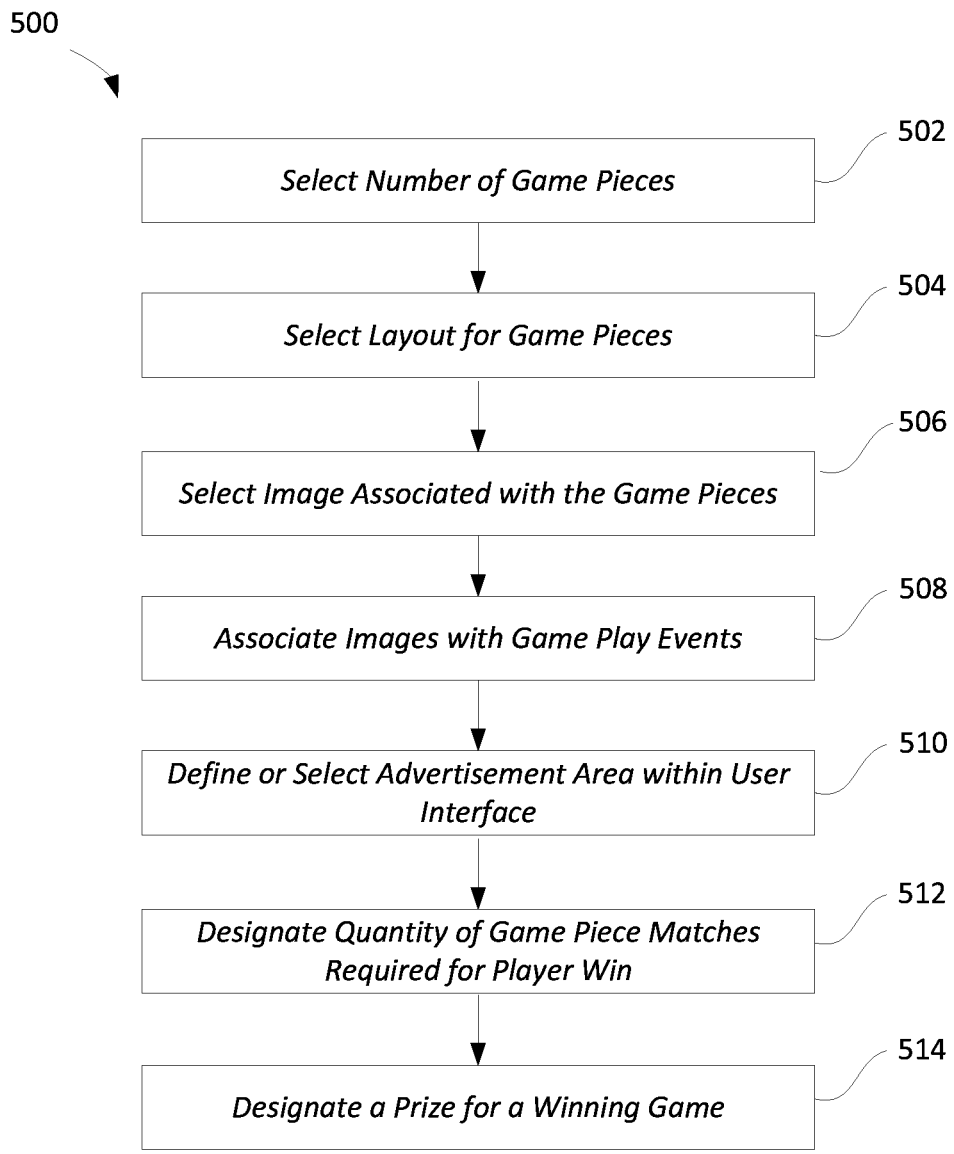
FIG. 5 shows a flow chart illustrating an exemplary process for customizing game play for a particular game, in accordance with the present disclosure.

FIG. 5 shows a flow chart illustrating an exemplary process 500 for customizing game play for a particular game. As FIG. 5 shows, the process 500 includes selecting a number of game pieces to include in the game 502. In one embodiment, the number of pieces may be determined by setting odds into the gaming application. In this way, a merchant-user or administrator may more conveniently forecast the economics of marketing using the gaming application. Additional embodiments provide a platform for customizing, creating and distributing the gaming applications. The platform includes a game design module, a campaign management module, mobile module and a game operation module with a random number generator.

At step 504, an administrator may select a layout for the game pieces. The game design module interface allows the user to create and save a customized gaming application. In one embodiment, the user can work or select from pre-loaded game layout templates. As an example, the game pieces can be a playing surface may consist of six rows of game pieces, each containing five pieces, or a line or circle of game pieces.

At step 506, the administrator can select an image that may represent each of the plurality of game pieces. In one embodiment, the game pieces can have logos or other commercial pictures such as an advertisement message. In one exemplary application an administrator is able to upload a digital image, such as a game piece, helmet or banana.

At step 508, the user may specify or associate different images, or sets of images to set stages of gameplay or game play events. For example, one image may be uploaded and associated with an initial start of the game, another image may be provided that indicates that a player has selected that piece, another image that is displayed as the random number generator operates and, another image that displays if the game piece is the winning piece.

At step 510, the administrator is also able to dedicate part of the game screen to advertisements. The administrator can link this advertising screen space to ads provided by the administrator or allow ads from other companies to appear on the game screen as desired.

At step 512, the administrator is able to designate the number of game piece matches required for a player win. As described herein above, to win the user-player must select which game piece or pieces the gaming application will randomly select. The administrators are able to specify the number of game pieces that a player must correctly guess to win, for example one game piece match for a win, or two game piece matches for a win, at either the game creation or the game deployment. Requiring more matches effectively decreases the chances for a winner. As an example, if the field of game pieces includes 30 game pieces and the player has to correctly guess which game piece the random number generator will select to win, the player has a one in thirty chance of winning. If the user-player must guess the two game pieces that the randomizer will select, the odds drop to 1 in 900. In one embodiment, the administrator is able to specify what will be displayed both in case of a win or a loss.

At step 514, the administrator is further enable to designate a prize in case of a win at either the game creation or the game deployment. The prize can be something delivered to the mobile device for immediate use. For example, a number or barcode that can be used for a free drink, the right or option of receiving something at a future date, for example a coupon that can be redeemed online to purchase more lottery tickets or an opportunity to participate in an event or happening, for example sideline passes to the football game the winner is currently attending. In one embodiment, the administrator is enabled to select a redeemable coupon as the prize deliverable, whereby the gaming application is configured to generate a unique identification for each generated redeemable.

Figure 6:
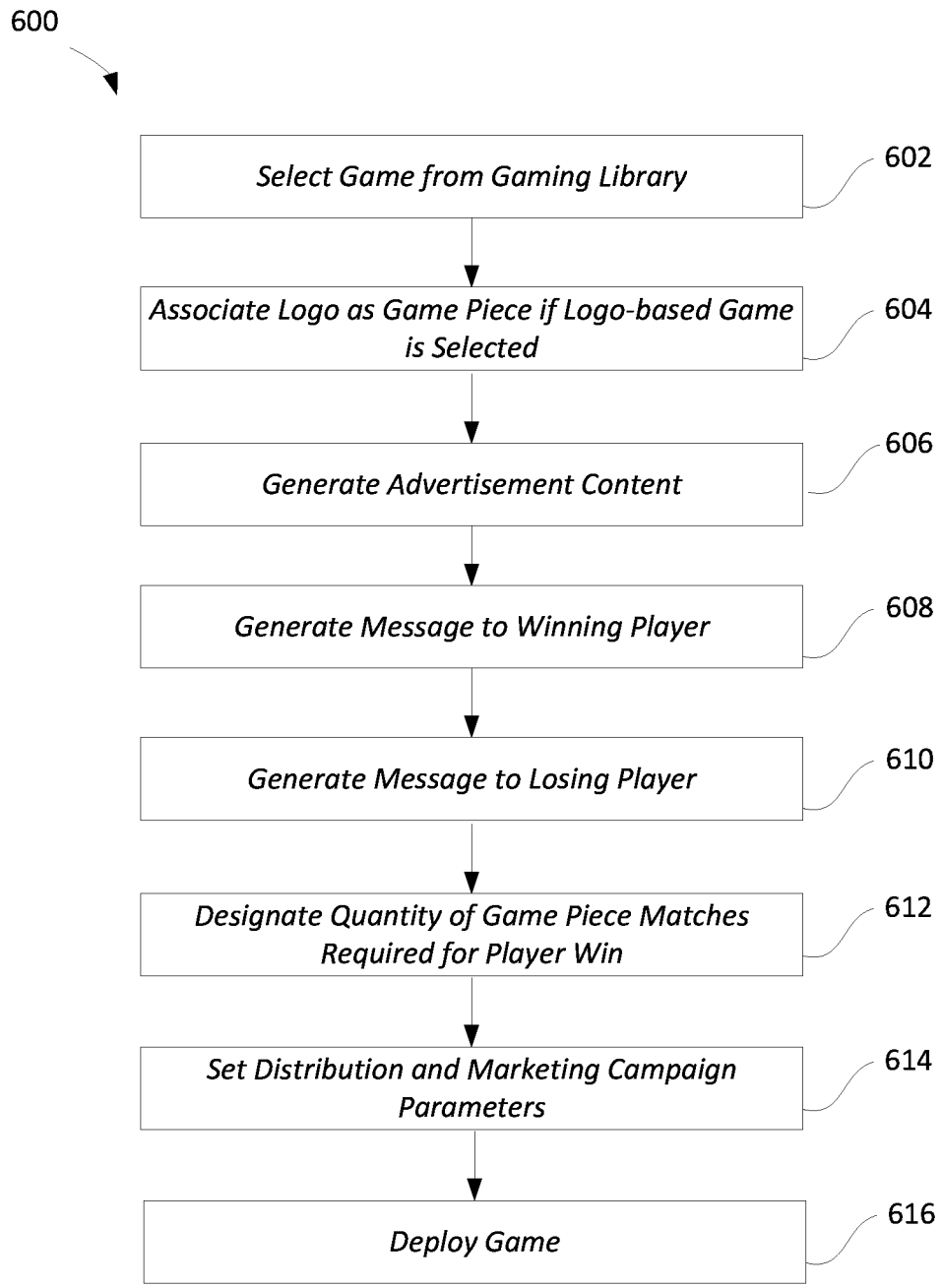
FIG. 6 shows a flow chart illustrating an exemplary advertisement management process for deploying a particular game for use by user-players, in accordance with the present disclosure.

FIG. 6 shows a flow chart illustrating an exemplary advertisement management process 600 for deploying a particular game for use by user-players. As FIG. 6 shows, the process 600 includes step 602 whereby an administrator is provided a selection of games from which to select. The games available are previously stored in a library of games. Games are preferably categorized into two categories: a logo-based game or a game-pieces-based game.

At step 604, an administrator is able to provide a logo to incorporate into the selected game, if the selected game is a logo-based game. The logos are then incorporated into the game pieces as described herein above.

At step 606, the administrator selects advertising content for display during gameplay. The advertising content may be uploaded as described herein above and may include banner-formed advertisements and/or video content.

At step 608, the administrator selects display content provided to a user-player after a successful player win. At step 610, the administrator selects display content provided to a user-player after a player loss. At step 612, the administrator may specify a number of game piece matches necessary to win.

At step 614, the administrator may set various distribution and marketing campaign parameters. Distribution and audience parameters includes specifying the duration a particular game will be available for play by user-players, and or setting availability based upon quantity of awarded prizes. In one embodiment, the administrator can define which consumers, selected by age, state of residence, or other demographic information, will receive access to the game. Further, the game operator can use an existing membership list and list management platform to target and distribute the game to consumers based on selected parameters, for example selected by age, state of residence, or other demographic information, advertiser preferences or state regulations. Once the game operator has created the campaign, the game can be deployed to mobile users based on the parameters of the campaign at step 616. One skilled in the art will readily recognize that the some of the steps performed herein may be executed in any order or concurrently.

Figure 7:
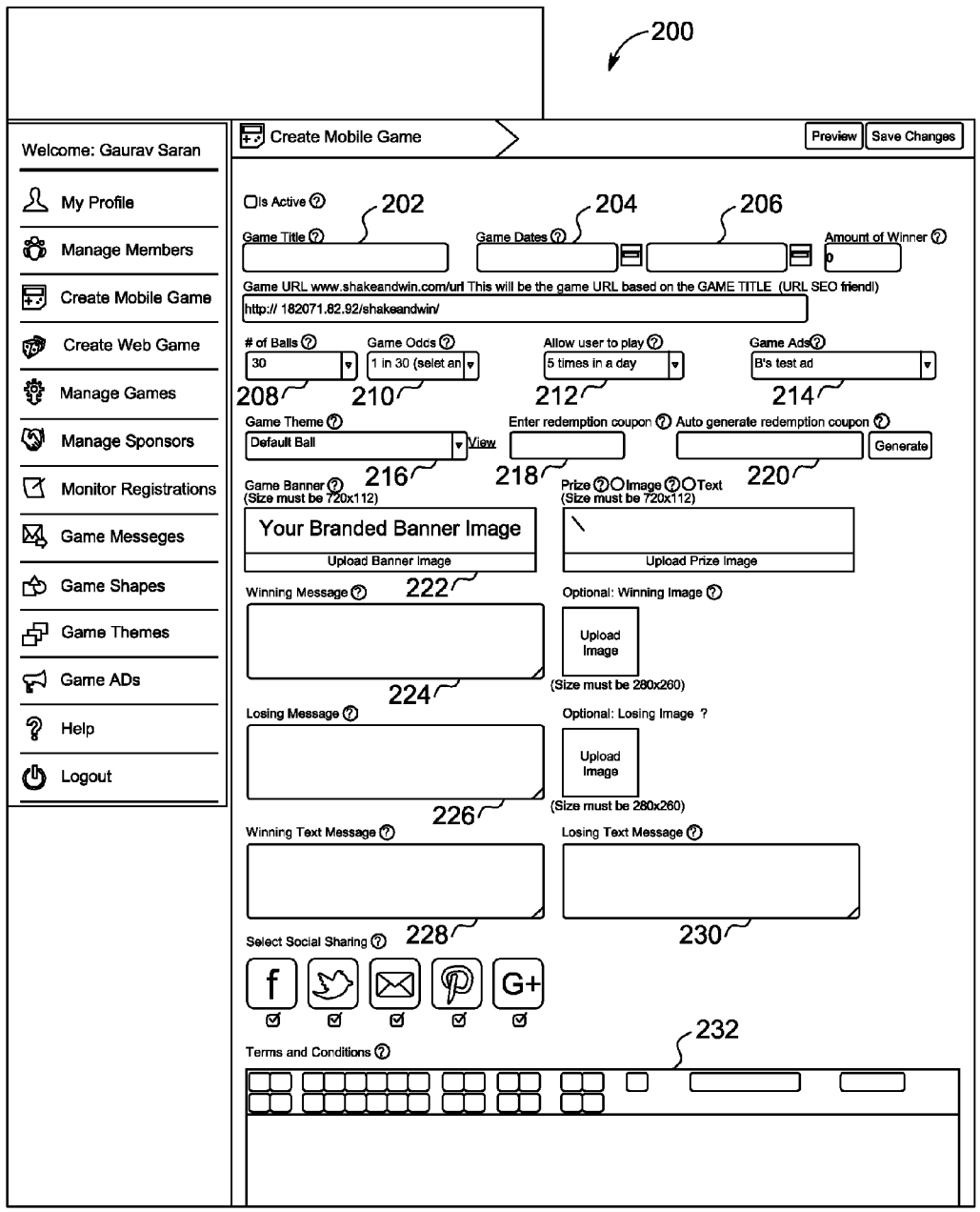

FIG. 7 shows an exemplary administrative user interface 200 for customizing the game place in accordance with the flow charts of FIGS. 5 and 6. As FIG. 7 shows, a user may provide a game title 202. Active dates may be provided in fields 204 and 206 comprising an active date range. The number of identifiable game pieces and the game odds may be selected via a drop down menus 208 and 210, respectively. A game play limit 212 may be selected providing a maximum quantity of games that any single user may play in a given time period, e.g., a day. A game advertisement may be selected from a drop down menu 214 of selectable, pre-stored advertisements. A game theme may be selected from a plurality of selectable game themes 216. A redemption coupon may be supplied 218 or automatically generated 220. A banner 222 showing an advertisement message or game communication may be displayed and selected from within the interface 200. Communication messages may be supplied upon occurrence of game events such as winning 224 and losing 226. SMS communications may be supplied in fields 228 and 230. Term and conditions of the game may be supplied in a field 232.

FIG. 8 shows an administrative user interface 250 for managing and customizing game themes. As FIG. 8 shows, a plurality of themes 252 may be stored and viewed by a user. In one embodiment, features of the theme may be customized. For example, a ball image, a selected ball image, a winning ball image, a winning ball on selected ball image may be individually customized. Various colors and text font may be selected, in one embodiment.

Figure 9:
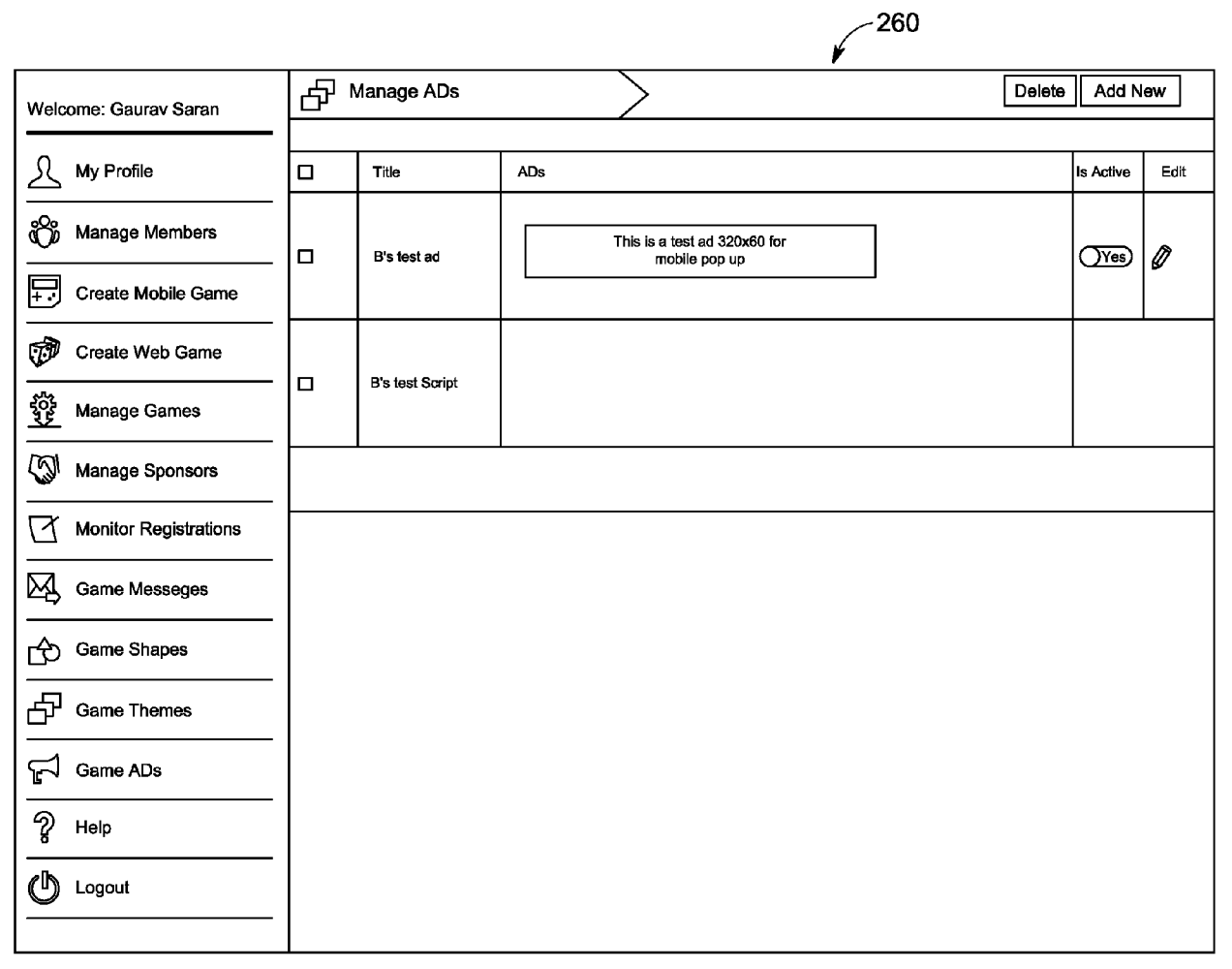

FIG. 9 shows an administrative user interface 260 for managing advertisements. As FIG. 9 shows, the user interface 260 may be configured to enable a user to upload an image corresponding to a predefined pixel size. The image utilized automatically within the game as an advertisement.

Figure 10:
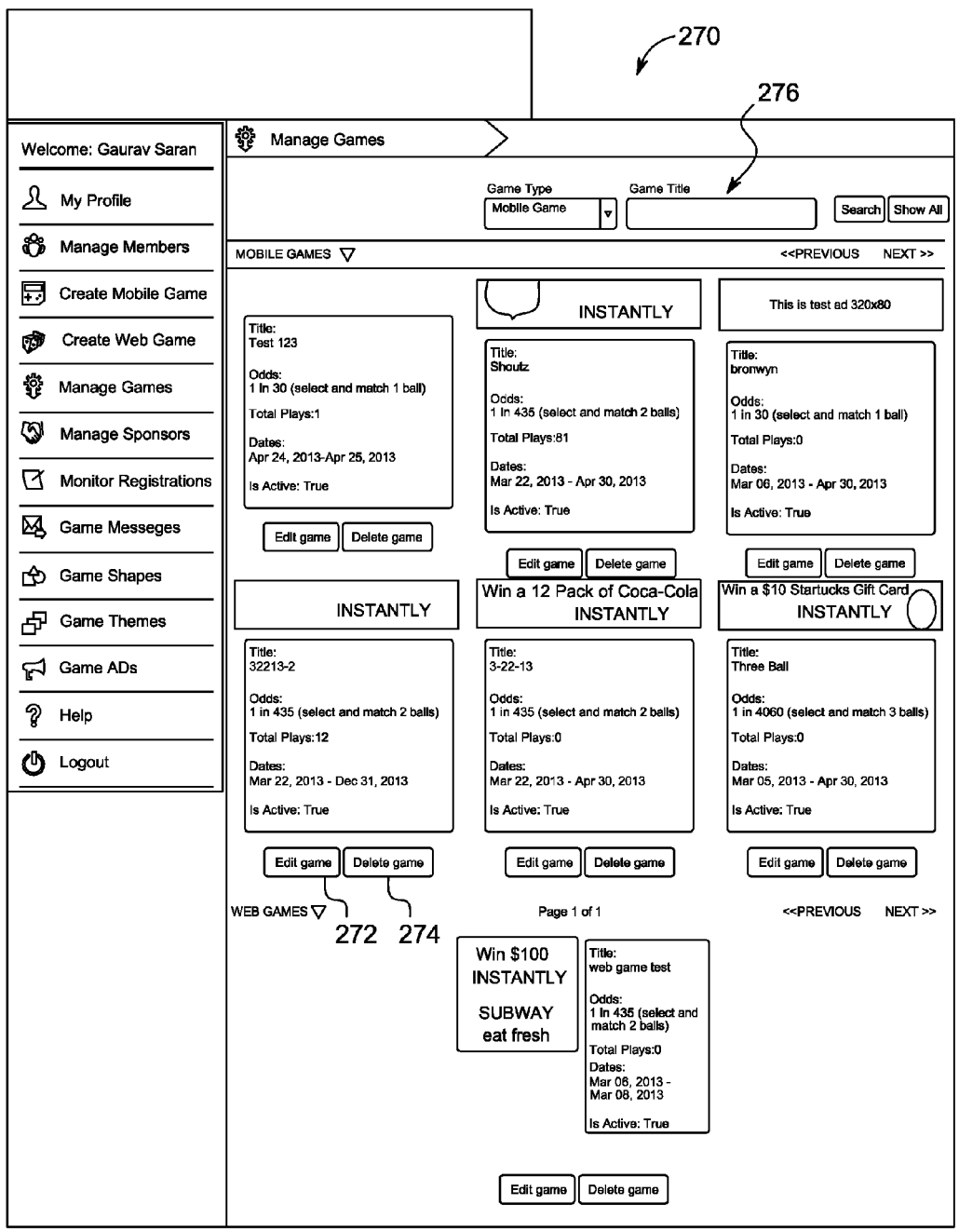

FIG. 10 shows an administrative user interface 270 for managing a plurality of games. In one embodiment, the user interface 270 enables a user to navigate to the user interface using a navigational button 272 for editing a selected game such as shown in FIG. 7. Games may be deleted upon actuation of a button 274. In one embodiment, search features may be provided 276.

Figure 11:
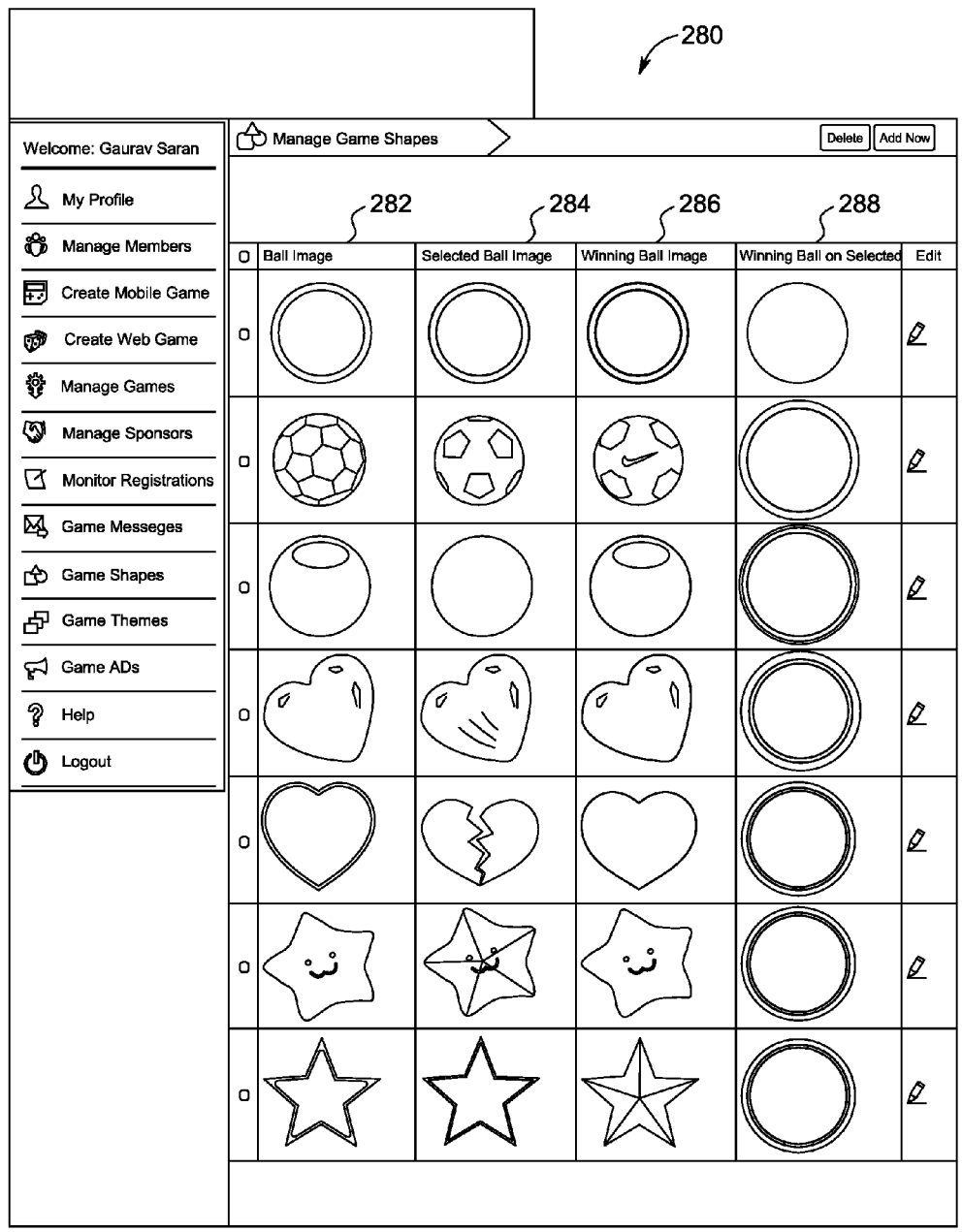

FIG. 11 shows an administrative user interface 280 for managing game shapes. As FIG. 11 shows, a plurality of sets of game shapes may be included in the database. The sets of game shapes preferably include a shape corresponding to an identifiable game piece 282, a user-selected identifiable game piece 284, a winning identifiable game piece 286, and a user-selected identifiable game piece selected as a winner 288.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for allocating virtual prizes, the method comprising:
    monitoring tactile input from a user;
    providing to the mobile device, in response to a request from a user, a game comprising a plurality of identifiable game pieces, the game pieces displayed on a playing surface of a user interface;
    receiving, from a server, an advertisement;
    displaying the advertisement adjacent to the playing surface within the user interface on the mobile device;
    initiating play of the game based upon the monitored tactile input from the user by the mobile device;
    associating, by the server, one or more of the plurality of identifiable game pieces to a prize based upon input from a random number generator;
    receiving input from a user of the mobile device, the input indicating selection of a user-selected game piece from the plurality of game pieces;
    comparing the user-selected game piece to the associated one or more of the plurality of identifiable game pieces to the prize; and
    allocating the prize to the user based upon the comparing, wherein the allocating comprises associating the user with the virtual prize within the server.

2. The method of claim 1, further comprising:
    disassociating the associated one or more of the plurality of identifiable game pieces from the prize for a subsequent user-initiated game.

3. The method of claim 1, wherein the plurality of identifiable game pieces each include a second advertisement.

4. The method of claim 1, wherein the initiating play of the game based upon the monitored tactile input from the user further comprises initiating play of the game when the monitored tactile input indicates that the mobile device has been shook.

5. The method of claim 1, wherein the initiating play of the game based upon the monitored tactile input from the user further comprises initiating play of the game when the monitored tactile input is greater than a predetermined threshold.

6. The method of claim 1, wherein the receiving input is received from a touch-sensitive display of the mobile device.

7. The method of claim 1, further comprising:
    providing an administrative interface for configuring game play, controlling game settings, setting game parameters including duration of game play and duration of game availability, setting game odds, setting a quantity of the plurality of the identifiable game pieces of the game, setting the arrangement of the game pieces, setting a graphical representation of the game pieces, specifying a prize for the award, specifying a response to provide non-winners, and providing functionality to create and save more than one game.

8. The method of claim 7, wherein the setting the graphical representation of the identifiable game pieces comprises:
    providing settings to control a shape of the game pieces;
    providing settings to change and upload an image to transpose on the game pieces; and
    providing settings to change a color of the game pieces.

9. The method of claim 7, wherein the prize is selected from a group consisting of a redeemable coupon, a participation in a subsequent event, and an additional opportunity to participate in a subsequent game.

10. The method of claim 7, wherein the administrative interface is provided via an HTML-based web page and wherein the method is further comprising:
    providing control settings via an HTML-based web page to change the graphical representation of the game pieces upon occurrence of a predetermined game event, wherein the predetermined game event may be specified and a graphical representation may be specified and associated with the predetermined game event; and
    providing predefined HTML drop down menus having predefined selections corresponding to various features of the game, wherein a first down menu comprises predefined quantities of identifiable game pieces, and wherein a second drop down menu comprises predefined odds of the game.

11. Method for allocating virtual prizes to attendees of an entertainment event, the method comprising:
    registering a plurality of mobile devices with a server, wherein the registering is conditional based upon location of the mobile device, the location determined by supplied GPS coordinates;
    providing a user interface to the registered mobile device, the user interface including an advertisement;
    requesting a user's picture from each of the registered mobile devices;
    receiving the user's picture from one or more registered mobile devices;
    filtering the received user's pictures;

displaying one or more of the received user's pictures on a public display at the entertainment event based upon the filtering;
randomly selecting one or more of the received user's pictures;
allocating the prize to a user associated with the selected one or more of the received user's pictures,
transmitting a merchant-scannable QR code to the user associated with the selected picture based upon the allocating; and
displaying the selected one or more of the received user's pictures on the public display at the entertainment event based upon the allocating.

12. The method of claim 11, wherein the allocating the prize comprises sending at least one of a text message and an email.

13. The method of claim 11, further comprising:
providing a unique QR scannable code configured to communicatively direct a mobile application to a downloadable instruction set configured to execute, on a processor of the mobile device, communications and data transmissions between the mobile device and the server.

14. The method of claim 11, wherein the filtering the received user's pictures further comprises:
checking a timestamp associated with metadata of the received user's picture;
confirming that a face is included in the received user's picture; and
excluding from the displaying and the allocating received user's pictures having a timestamp greater than a predetermined time period in the past or failing to confirm that a face is included in the received user's picture.

15. The method of claim 11, further comprising:
executing the registering, the requesting, the receiving, and the allocating using a web-accessible URL address.

16. The method of claim 11, further comprising: notifying a user of the allocating using a communication to the mobile device, the communication comprising a text message and an email.

17. The method of claim 11, wherein the advertisement is at least one of a banner advertisement and a video advertisement.

18. A non-transitory machine-readable medium having machine executable instructions stored thereon that, when executed by one or more processors, direct the one or more processors to perform a method comprising:
monitoring tactile input from a user;
providing, in response to a request from a user, a game comprising a plurality of identifiable game pieces, the game pieces displayed on a playing surface, and wherein at least one game pieces includes an advertisement message;
receiving, from a server, a video banner advertisement;
displaying the video banner advertisement adjacent to the playing surface;
initiating play of the game when the monitored tactile input from the user indicates that the mobile device has been shook;
associating one or more of the plurality of identifiable game pieces to a prize based upon input from a random number generator;
receiving input from a user, the input indicating selection of a user-selected game piece from the plurality of game pieces;
comparing the user-selected game piece to the associated one or more of the plurality of identifiable game pieces to the prize; and
awarding the prize to the user based upon the comparing, wherein the prize is selected from a group consisting of an instantaneously available redeemable coupon having a merchant-scannable QR code, a participation in a subsequent event, and an additional opportunity to participate in a subsequent game.

19. The non-transitory machine-readable medium of claim 18, further comprising:
providing an HTML-based web page administrative interface for configuring game play, controlling game settings, setting game parameters including duration of game play and duration of game availability, setting a graphical representation of the game pieces, specifying a prize for the award, specifying a response to provide non-winners, providing functionality to create and save more than one game, and selecting arrangement of the game pieces from a group consisting of a circle, field, and line; and
providing predefined HTML drop down menus having predefined selections corresponding to various features of the game, wherein a first down menu comprises predefined quantities of identifiable game pieces, and wherein a second drop down menu comprises predefined odds of the game.

20. The non-transitory machine-readable medium of claim 19, further comprising:
providing control settings to change the graphical representation of the game pieces upon occurrence of a predetermined game event, wherein the predetermined game event may be specified and a graphical representation may be specified and associated with the predetermined game event;
providing settings to control a shape of the game pieces;
providing settings to change and upload an image to transpose on the game pieces; and
providing settings to change a color of the game pieces.

* * * * *